United States Patent
Kusano et al.

(10) Patent No.: US 8,022,354 B2
(45) Date of Patent: Sep. 20, 2011

(54) ABSOLUTE POSITION LENGTH MEASUREMENT TYPE ENCODER

(75) Inventors: Kouhei Kusano, Kawasaki (JP); Kouji Morimoto, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 396 days.

(21) Appl. No.: 12/431,340

(22) Filed: Apr. 28, 2009

(65) Prior Publication Data
US 2009/0272886 A1   Nov. 5, 2009

(30) Foreign Application Priority Data
May 1, 2008   (JP) ................. 2008-119773

(51) Int. Cl.
*G01D 5/34* (2006.01)
(52) U.S. Cl. .............. 250/231.13; 250/231.18
(58) Field of Classification Search ........ 250/231.13–231.18, 237 G
See application file for complete search history.

(56) References Cited

U.S. PATENT DOCUMENTS
7,060,968 B1 *  6/2006  Leviton ............ 250/231.13
* cited by examiner

*Primary Examiner* — Tony Ko
(74) *Attorney, Agent, or Firm* — Rankin, Hill & Clark LLP

(57) ABSTRACT

The absolute position length measurement type encoder is provided with a scale for forming bright and dark patterns by the ABS pattern based on a pseudorandom code; an edge position detection circuit for obtaining a position, at which an after-differentiated absolute value of a binarized value is locally maximized, for each of the minimum line width zones of the ABS pattern by binarizing a signal from the light-receiving element that receives the bright and dark pattern; a peak position detection circuit for obtaining the peak position from a histogram with respect to the position; a decoding circuit for decoding the pseudorandom code based on the binarized value; an absolute position detection circuit for calculating an absolute position by referencing the pseudorandom code to the design value; and a position data synthesizing circuit for correcting the absolute position by the peak position, whereby the absolute position can be calculated with a small arithmetic operation amount even if the pseudorandom code is used for the ABS pattern, and accuracy of the absolute position can be secured even where the ABS pattern is subjected to thickening, etc.

12 Claims, 6 Drawing Sheets

ABSOLUTE POSITION LENGTH MEASUREMENT TYPE ENCODER

CROSS-REFERENCE TO RELATED APPLICATION

The disclosure of Japanese Patent Application No. 2008-119773 filed on May 1, 2008 including specifications, drawings and claims is incorporated herein by reference in its entirety.

BACKGROUND OF THE INVENTION

1. Field of the Invention

The present invention relates to an absolute position length measurement type encoder that includes a light-emitting element, a scale for forming bright and dark patterns with pseudorandom codes on projection light of the light-emitting element, and a light-receiving element, and in particular to an absolute position length measurement type encoder the arithmetic operation amount of which is small while being highly accurate.

2. Description of the Related Art

Accurate position control and measurement are indispensable in measuring instruments and apparatuses. Therefore, an absolute position length measurement type encoder capable of executing absolute position measurement over some length has been used. In particular, where high accuracy is required, a photoelectric type encoder has been used.

Generally, an absolute position length measurement type photoelectric encoder has an absolute pattern (hereinafter called an ABS pattern) to roughly measure a moving distance and an incremental pattern (hereinafter called an INC pattern) to measure a moving distance at high resolution power by interpolating the interval of a roughly obtained moving distance on a scale (For example, Japanese Published Unexamined Patent Application No. 2003-234941 (hereinafter called Patent Document 1), Japanese Translation of International Application (Kohyo) No. 2005-515418 (hereinafter called Patent Document 2)). And, for example, the scale is attached to a moving stage side, and the light-emitting element and light-receiving element are attached to the base side that supports the stage.

And, since bright and dark patterns formed of ABS patterns and INC patterns, which are formed on the scale, change on the light-receiving element, which receives the bright and dark patterns, in line with movement of the stage, the moving distance can be measured at high accuracy by processing the change in a signal processing circuit. In detail, rough absolute positions are obtained by the ABS pattern, and a minute position between the absolute positions obtained by the ABS pattern is obtained by the INC pattern. That is, it is necessary that the absolute position itself obtained by the ABS pattern be stabilized with high accuracy.

Also, a plurality of patterns whose cycles differ from each other are used as the ABS pattern, and the absolute positions are obtained by the phase relationship thereof. However, as the measurement distance is lengthened, such a problem arises in which the number of the above-described patterns is increased, and the scale and light-receiving element are large-sized. Accordingly, the absolute position length measuring type encoder itself can be downsized by using a single pattern based on a pseudorandom code as the ABS pattern.

However, where the pseudorandom codes are used for the ABS pattern, the arithmetic operation amount is increased for measurement of the absolute position, it takes a large amount of time for the arithmetic operation, and it is not possible to output a result of measurement of a moving distance at a high speed. Describing in detail, this is because, when processing signals of the light-receiving element, which receives bright and dark patterns, in the form of digital signals, for example, the data of one pixel becomes 4 bits where the signal of the light-receiving element is converted by 4-bit grayscale in order to secure the measurement position accuracy of the absolute position, and if an arithmetic operation for correlation is carried out in regard to the entirety of the circulation period data based on the pseudorandom code directly using the pixel data length, the arithmetic operation amount becomes enormous.

Accordingly, with respect to measurement of a moving distance, position measurement based on the INC pattern is regularly carried out without frequently executing position measurement based on the ABS pattern. However, in this case, although the ABS pattern is provided, correct absolute position is not output if erroneous counting occurs by the INC pattern when moving at a high speed. And, erroneous values of the position measurement are continuously output until the next absolute position measurement is carried out. That is, there remains a problem that the reliability in absolute position measurement is low regardless of being the absolute position length measurement type encoder. Further, such an attempt (Particularly, Patent Document 2, etc.) was made in which an absolute position is obtained by binarizing the pixel data with the accuracy of the absolute position maintained by comparing the outputs between the light-receiving elements. However, finally, the process is complicated to cause the arithmetic operation amount to be increased, wherein a problem similar to the above arises.

Also, although the ABS pattern is required to be formed at an accurate interval based on the pseudorandom codes, the patterns may be made thick or thin depending on the conditions of the formation process. In this case, another problem occurs, by which the accuracy of the absolute position obtained by the ABS pattern may be reduced, and becomes unstable.

SUMMARY OF THE INVENTION

The present invention was developed to solve the prior art problems described above, and it is therefore an object of the present invention to provide an absolute position length type measurement encoder capable of calculating an absolute position with a small arithmetic operation amount even by using pseudorandom codes for ABS pattern, and capable of securing accuracy in absolute positions obtained even in a case where the ABS pattern is made thick or thin.

A first aspect of the invention of the present application includes:

a light-emitting element;

a scale having an absolute pattern (ABS pattern) based on a pseudorandom code and forming bright and dark patterns by the absolute pattern (ABS pattern) on the projection light from the light-emitting element;

a light-receiving element for receiving the bright and dark patterns;

an edge position detection circuit for obtaining a position, at which an after-differentiated absolute value of a binarized value is locally maximized, for each of the minimum line width zones of the absolute pattern (ABS pattern) by binarizing a digital signal in accordance with a signal output from the light-receiving element;

a peak position detection circuit for preparing a histogram for the position where the absolute value is locally maximized in the minimum line width zone and for obtaining the peak position from the histogram;

a decoding circuit for decoding pseudorandom codes based on the binarized value;

a position detection circuit (absolute position detection circuit) for calculating the absolute position of the scale in regard to the light-receiving element by referencing the decoded pseudorandom code with respect to the design value of the pseudorandom code; and a position data synthesizing circuit for correcting the absolute position of the scale, which has been obtained by the position detection circuit, by the peak position. Thereby, the above-described problems are solved.

A second aspect of the invention of the present application is featured in that the light-receiving element is made into an array, and the arrangement pitch thereof is one-third or less the minimum line width of the absolute pattern.

A third aspect of the invention of the present application is featured in that the scale includes an incremental pattern.

A fourth aspect of the invention of the present application is featured in including:

a light-receiving element for receiving bright and dark patterns formed by the incremental pattern;

an incremental position detection circuit for detecting an incremental position by processing a signal output from the light-receiving element; and an absolute position output circuit for selecting which of a signal output from the incremental position detection circuit or an absolute synthesization position signal output from the position data synthesizing circuit is to be output as a position data signal.

A fifth aspect of the invention of the present application is featured in that the absolute position output circuit usually selects a signal output from the incremental position detection circuit, references the signal to the absolute synthesization position signal once every predetermined interval of time, outputs an absolute synthesization position signal as a position data signal if there is a difference in the absolute positions obtained by two signals, and feeds the position data signal back to the incremental position detection circuit and sets it up as the current position in the inside of the incremental position detection circuit.

A sixth aspect of the invention of the present application is featured in that the feedback is carried out when data are not renewed in the position data synthesizing circuit by a data refreshing rate.

A seventh aspect of the invention of the present application is featured in that the peak position detection circuit interpolates respective values of a histogram by fitting a probability distribution function by the least-squares method and obtains the peak position.

An eighth aspect of the invention of the present application is featured in that the decoding circuit decodes a pseudorandom code from the binarized value using the obtained peak position as the reference position of the pseudorandom code.

A ninth aspect of the invention of the present application is featured in that the peak position obtained by the decoding circuit is obtained by interpolating the values of the histogram.

Also, a tenth aspect of the invention of the present application is featured in that the decoding circuit obtains the respective total numbers of the binarized values (0 and 1) in the minimum line width, and determines and decodes the code of the minimum line width based on the value (0 or 1) the total number of which is greater.

In addition, an eleventh aspect of the invention of the present application is featured in that the position detection circuit carries out an arithmetic operations for correlation between the decoded pseudorandom code and the design value of the pseudorandom code, and obtains the absolute position of the scale with respect to the light-receiving element.

Further, a twelfth aspect of the invention of the present application is featured in that the position data synthesizing circuit synthesizes the position data by adding the peak position of the peak position signal to the absolute position of the absolute position signal.

According to the present invention, it is possible to calculate the absolute position at high accuracy with a small arithmetic operation amount using a pseudorandom code for the ABS pattern. Therefore, since the absolute position can be frequently calculated from the ABS pattern, it is possible to measure the moving distance of a scale with respect to a light-receiving element having a good slaved tracking performance with accuracy maintained in the case where a scale moves rapidly and greatly, for example.

Also, accuracy of an obtained absolute position can be secured even where the ABS pattern is made thick or thin. Accordingly, since it is not necessary to require strict formation process conditions of the ABS pattern, it is possible to achieve a decrease in production costs of the scale and the absolute position length measurement type encoder.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Hereinafter, a detailed description is given of embodiments of the present invention with reference to the drawings.

Figure 1:
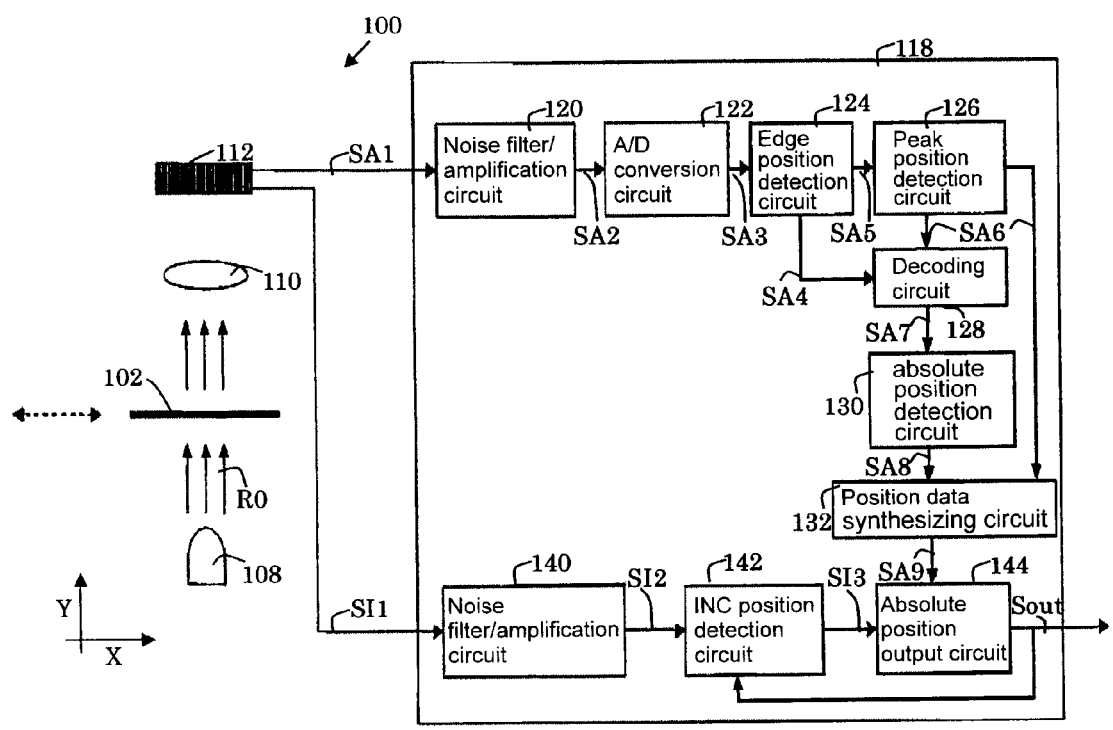
FIG. 1 is a schematic view showing the entirety of an absolute position length measurement type encoder according to Embodiment 1 of the present invention.
Figure 2:
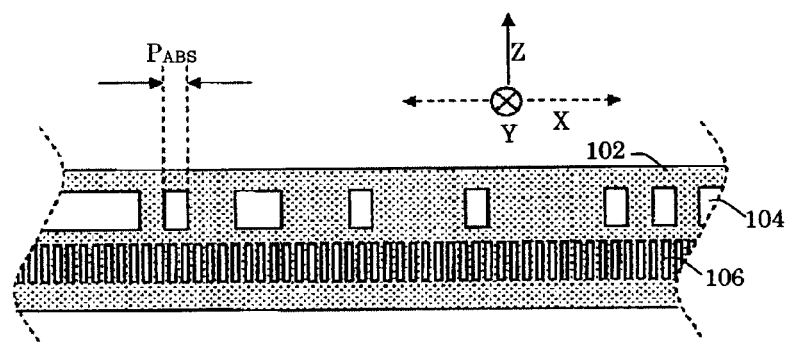
FIG. 2 is a perspective view exemplarily showing the relationship between a light-emitting element, a scale and a light-receiving element according to Embodiment 1 thereof.
Figure 3:
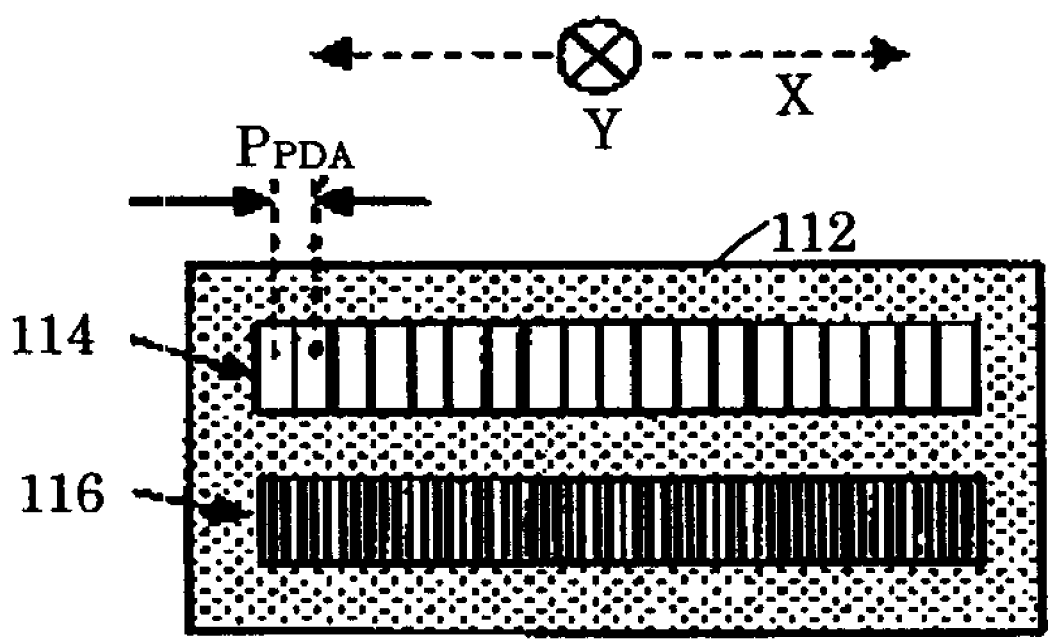
FIG. 3 is a schematic view showing the same scale.
Figure 4:
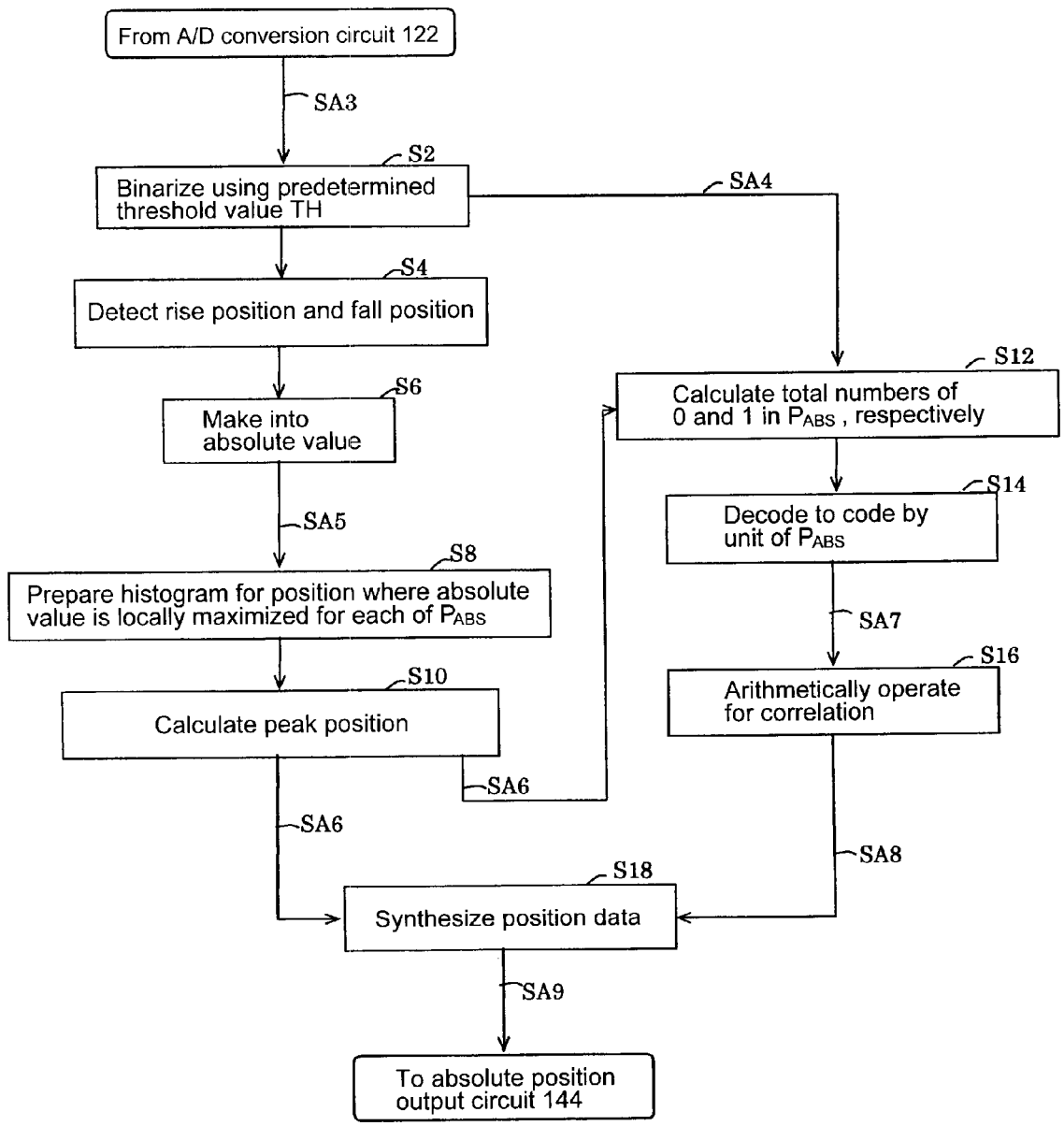
FIG. 4 is a schematic view showing the same light-receiving element.
Figure 5:
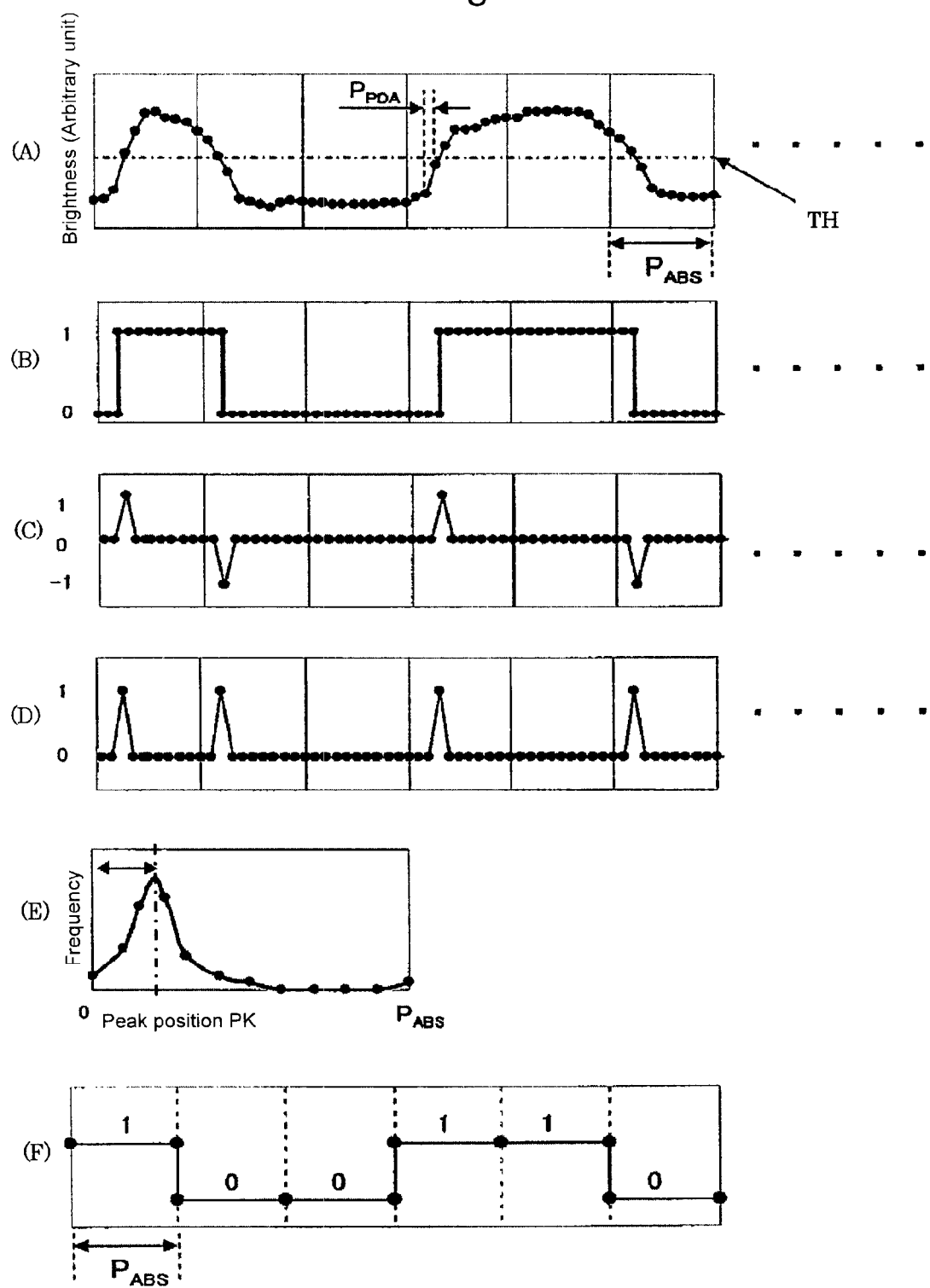
FIG. 5 is a flowchart showing operations from an edge position detection circuit to a position data synthesizing circuit according to Embodiment 1 thereof.
Figure 6:
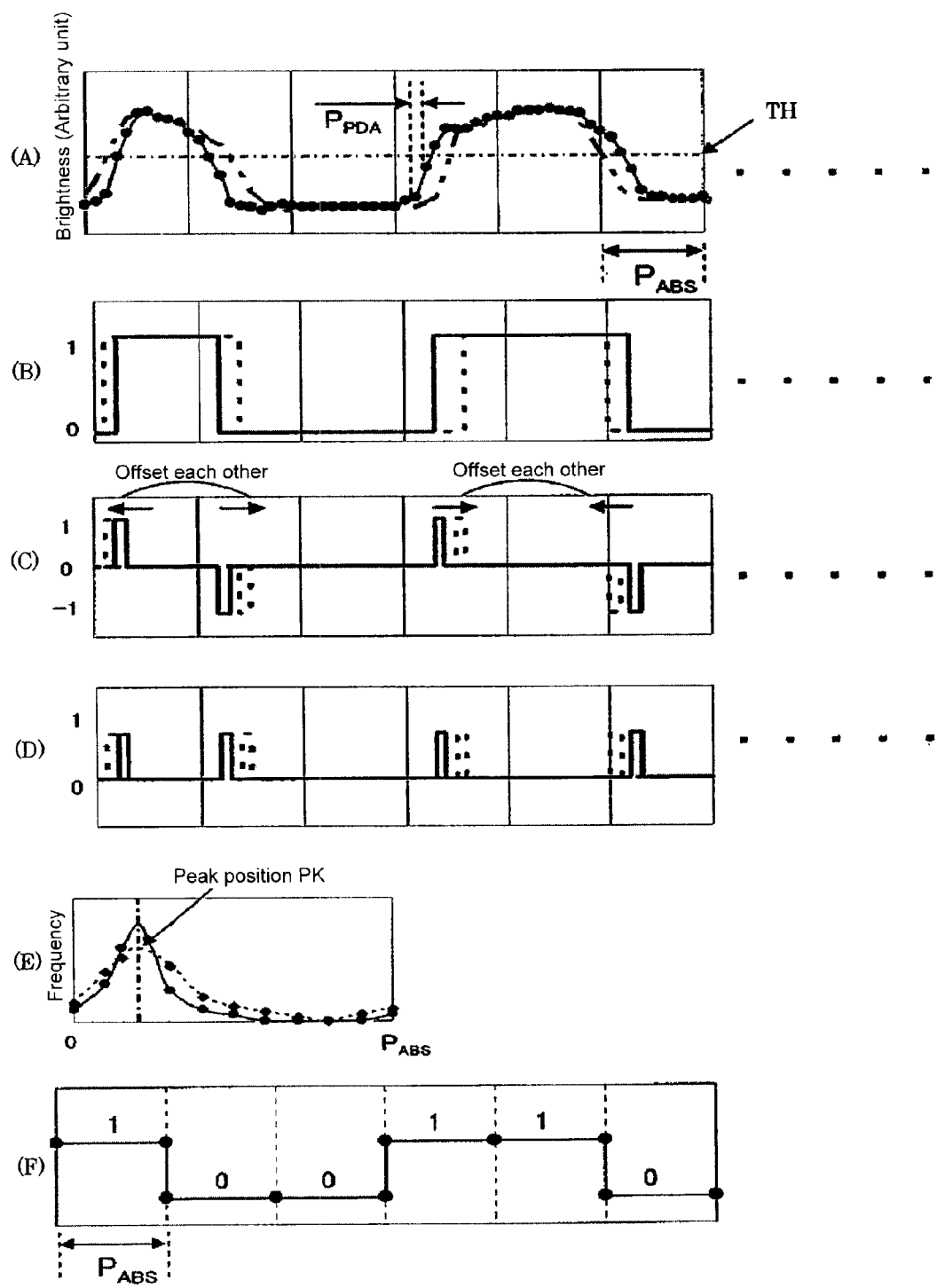
FIG. 6 is a schematic view showing signals corresponding to respective steps of FIG. 5.
Figure 7:
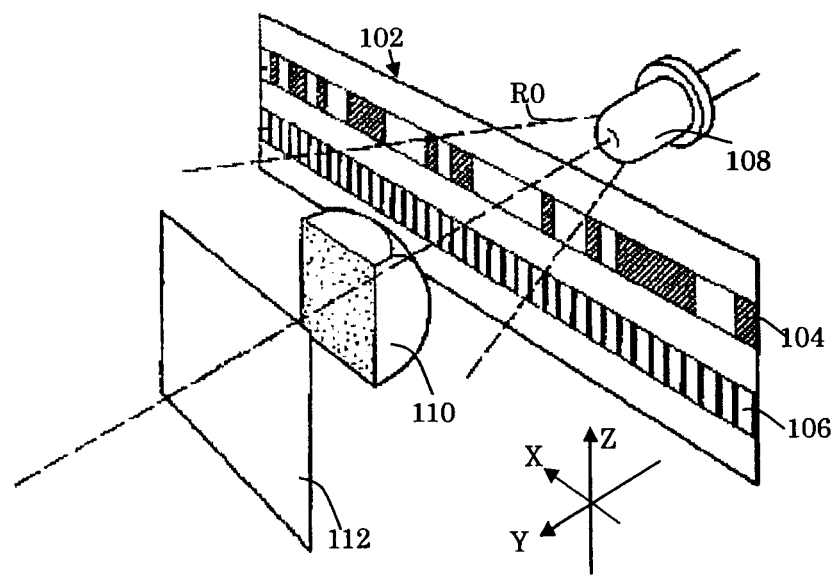
FIG. 7 is a schematic view showing signals corresponding to respective steps of FIG. 5 when the line width of an ABS pattern is subjected to thickening.

A description is given of Embodiment 1 according to the present invention with reference to FIG. 1 through FIG. 7. FIG. 1 is a schematic view showing the entirety of an absolute position length measurement type encoder according to the embodiment. FIG. 2 is a perspective view exemplarily showing the relationship between a light-emitting element, a scale and a light-receiving element. FIG. 3 is a schematic view showing the scale. FIG. 4 is a schematic view showing the light-receiving element. FIG. 5 is a flowchart showing operations from an edge position detection circuit to a position data synthesizing circuit. FIG. 6 is a schematic view showing signals corresponding to respective steps of FIG. 5. And, FIG. 7 is a schematic view showing signals corresponding to respective steps of FIG. 5 when the line width of ABS pattern is subjected to thickening.

First, a brief description is given of the entire configuration and the main components of the embodiment.

Mainly as shown in FIG. 1, an absolute position length measurement type encoder 100 includes:

a light-emitting element 108;

a scale 102 (Refer to FIG. 2 and FIG. 3) having an absolute pattern (hereinafter called "ABS pattern") 104 based on a pseudorandom code and forming bright and dark patterns by the ABS pattern 104 on the projection light R0 from the light-emitting element 108;

a light-receiving element 112 for receiving the bright and dark patterns;

an edge position detection circuit 124 for obtaining a position, at which an after-differentiated absolute value of a binarized value is locally maximized, for each of the zones of the minimum line Width $P_{ABS}$ of the ABS pattern 104 by binarizing a digital signal SA3 in accordance with a signal (ABS bright and dark signal SA1) output from the light-receiving element 112;

a peas position detection circuit 126 for preparing a histogram for the position where the absolute position is locally maximized in the zone of minimum line width $P_{ABS}$ and for obtaining the peak position PK from the histogram;

a decoding circuit 128 for decoding pseudorandom codes based on the binarized value;

an absolute position detection circuit (position detection circuit) 130 for calculating the absolute position of the scale 102 in regard to the light-receiving element 112 by referencing the decoded pseudorandom code with respect to the design value of the pseudorandom code; and a position data synthesizing circuit 132 for correcting the absolute position of the scale 102, which has been obtained by the absolute position detection circuit (position detection circuit) 130, by the peak position PK.

A detailed description is given below of respective components.

As shown in FIGS. 2 and 3, the scale 102 includes the ABS pattern 104 and the INC pattern 106. As light R0 projected from the light-emitting element 108 is irradiated onto the scale 102 orthogonal to the optical axis direction (Y-axis direction), bright and dark patterns are imaged on the light-receiving element 112 via the lens 110 by means of the ABS pattern 104 and the INC pattern 106. The ABS pattern 104 and the INC pattern 106 can form bright and dark patterns by being brought into a transparent state where the projection light R0 is not interrupted, if the code is 1, and into a non-transparent state where the projection light R0 is interrupted, if the code is 0, for example.

A pseudorandom code is used for the ABS pattern 104. Here, for example, M-sequence code, which becomes the longest cycle, of the code series generated by a shift register may be used as the pseudorandom code. At this time, the line width per one pseudorandom code becomes the minimum line width $P_{ABS}$ of the ABS pattern 104. The INC pattern 106 is a pattern consisting of cyclically formed 1 and 0. In the present embodiment, the ABS pattern 104 is disposed upside in the Z-axis direction in FIG. 3 while the INC pattern 106 is disposed downside. For example, an LED may be used as the light-emitting element 108.

The lens 110 may be composed of a single lens (for example, cylindrical lens, etc.) by which two patterns 104 and 106 are simultaneously imaged as shown in FIG. 2. Or, the lens 110 may be composed of two lenses, by which the ABS pattern 104 and the INC pattern 106 are individually imaged. In addition, the lens 110 may not necessarily be used.

As shown in FIG. 4, the light-receiving element 112 includes two light-receiving element arrays 114 and 116, one of which is the ABS light-receiving element array 114, and the other of which is a light--receiving element array 116 for the INC pattern. The array arrangement pitch $P_{PDA}$ of the ABS light-receiving element array 114 is as shown in FIG. 4. That is, the spatial resolution power of the ABS light-receiving element array 114 becomes an array arrangement pitch $P_{PDA}$. Here, the array arrangement pitch $P_{PDA}$ is narrower than the minimum line width $P_{ABS}$ of the ABS pattern 104, and may be made into, for example, one-third thereof or less. If the array arrangement pitch $P_{PDA}$ is made still narrower, the number of samplings in the minimum line width $P_{ABS}$ is increased, and further highly accurate measurement of the absolute position can be carried out. The ABS light-receiving element array 114 outputs an ABS bright and dark signal SA1 by sweeping the bright and dark patterns formed by the ABS pattern 104 in the array direction (the X-axis direction).

The INC light-receiving element array 116 has a four-phase output with a phase difference of 90° (not illustrated). The INC light-receiving element array 116 sweeps the bright and dark patterns formed by the INC pattern 106 in the array direction (the X-axis direction), and outputs the INC bright and dark signal SI1. Where the bright and dark patterns formed by the INC pattern 106 are detected by the INC light-receiving element array 116 consisting of four phases with a phase difference of 90°, a four-phase sinusoidal wave signal with a phase difference of 90° is output. In addition, the array arrangement pitch of the INC light-receiving element array 116 is narrower than the array arrangement pitch $P_{PDA}$ of the ABS light-receiving element array 114 in order to interpolate between an obtained absolute position and the absolute position.

As shown in FIG. 1, a noise filter/amplification circuit 120 processes the ABS bright and dark signal SA1 output from the light-receiving element 112. At this time, the noise filter/amplification circuit 120 cuts off high frequency noise by its low-pass filter, carries out amplification at a predetermined gain, and outputs a signal SA2.

As shown in FIG. 1, an A/D conversion circuit 122 converts the signal SA2 output from the noise filter/amplification circuit 120 from analog signals to digital signals, and outputs a signal SA3.

As shown in FIG. 1, the edge position detection circuit 124 first binarizes a signal SA3 output from the A/D conversion circuit 122, and when carrying out binarization, it is necessary to provide a predetermined threshold value TH. For example, in the present embodiment, the middle value between the minimum value and the maximum value of signal SA3 may be used as the predetermined threshold value TH. Another predetermined threshold value TH may be obtained based on a histogram or a threshold value TH may be obtained for each of the zones with the zones classified. And, the binarized value is output as signal SA4. The binarized value is made into an absolute value after being differentiated. The value is output as signal SA5.

As shown in FIG. 1, the peak position detection circuit 126 prepares a histogram in regard to the position that becomes a local maximum value (the maximum value in the minimum line width $P_{ABS}$) of a value obtained from signal SA5 for each of the minimum line width $P_{ABS}$ of the ABS pattern 104, and obtains the peak position PK from the histogram. The obtained value is output as signal SA6.

The decoding circuit 128 carries out processing based on a binarized value of the signal SA4 as the peak position PK of the signal SA6 as the position (reference position) where the pseudorandom code to be decoded is changed over as shown in FIG. 1. In detail, the decoding circuit 128 decodes the code to the pseudorandom code of 0 or 1 by the unit of the minimum line width $P_{ABS}$ of the ABS pattern 104 from the position shifted only by the peak position PK. The decoded code is output as the ABS decoding signal SA7.

As shown in FIG. 1, the absolute position detection circuit (position detection circuit) 130 calculates an absolute position of the scale 102 with respect to the light-receiving element 112 by referencing the decoded pseudorandom code being the ABS decoding signal SA7 to the design value of the pseudorandom code. In the present embodiment, the absolute position detection circuit 130 executes an arithmetic operation for correlation between the input ABS decoding signal SA7 and the design value of the pseudorandom code used to form the ABS pattern 104. Also, at this time, the design value of the pseudorandom code is tabulated, and an absolute position may be obtained by referencing the pseudorandom codes decoded in the table. The obtained absolute position is output as the ABS position signal SA8.

As shown in FIG. 1, the position data synthesizing circuit 132 obtains an accurate absolute position by shifting the ABS position signal SA8 output from the absolute position detection circuit (position detection circuit) 130 only by the peak position PK at the peak position signal SA6 obtained in the peak position detection circuit 126 and synthesizing (correcting) the same. The obtained absolute position is output as the ABS synthesization position signal SA9.

The noise filter/amplification circuit 140 processes a four-phase sinusoidal wave signal with a phase difference of 90°, which is an INC bright and dark signal SI1, as shown in FIG. 1. In detail, the noise filter/amplification circuit 140 cuts off high frequency noise by its low pass filter with respect to the INC bright and dark signal SI1, carries out amplification at a predetermined gain, and outputs a signal SI2.

The INC position detection circuit 142 processes the signal SI2 output from the noise filter/amplification circuit 140 as shown in FIG. 1. In detail, the INC position detection circuit 142 generates a two-phase sinusoidal wave signal with a phase difference of 90° from the four-phase sinusoidal wave signal with a phase difference of 90°, carries out an arc tangent operation, obtains the relative position.

The absolute position output circuit 144 selects, as shown in FIG. 1, which of the signal SI3 output from the INC position detection circuit 142 or the ABS synthesization position signal SA9 output from the position data synthesizing circuit 132 is output as a position data signal Sout. In the present embodiment, for example, usually the signal SI3 is selected, and the ABS synthesization position signal SA9 is output as the position data signal Sout if there is a difference in the absolute positions obtained from two signals by referencing the signal SI3 to the ABS synthesization position signal SA9 once every predetermined interval of time (which is appropriately set by the use conditions). Along therewith, the position data signal Sout is fed back to the INC position detection circuit 142 and is set as the current value inside the INC position detection circuit 142. In addition, the feedback is carried out when data are not renewed by a data refreshing rate in the position data synthesizing circuit 132.

Next, a description is given of a signal processing flow from the edge position detection circuit 124 to the position data synthesizing circuit 132 based on FIG. 5 by referencing FIG. 6 and FIG. 7.

First, the signal SA3 (refer to FIG. 6(A)) digitalized by the A/D conversion circuit 122 is binarized by a predetermined threshold value TH in the edge position detection circuit 124 (Step S2). Here, as shown in FIG. 6(A), the digitalized signal SA3 is digital data sampled at an interval of array arrangement pitch $P_{PDA}$ of the ABS light-receiving element array 114. And, the binarized and output signal SA4 is brought into a pattern shown in FIG. 6(B).

Next, the binarized value is differentiated in the same edge position detection circuit 124, wherein a rise position and a fall position are detected (Step S4). The signal at this time is brought into a pattern shown in FIG. 6(C).

Next, the obtained differential signal is made into an absolute value in the same edge position detection circuit 124 (Step S6). The signal at this time is brought into a pattern shown in FIG. 6(D). The value at this time is the signal SA5.

Next, with respect to positions where the value made into an absolute value per minimum line width $P_{ABS}$ of the ABS pattern 104 is locally maximized (the maximum value by the unit of the minimum line width $P_{ABS}$), a histogram is prepared at a zone of the minimum line width $P_{ABS}$ of the ABS pattern 104 in the peak position detection circuit 126 (Step S8).

Next, the peak position PK for frequency in the histogram is calculated in the same peak position detection circuit 126 (Step S10). FIG. 6(E) shows a histogram with respect to the positions where the value is locally maximized in a zone of the minimum line width $P_{ABS}$ of the ABS pattern 104. In the drawing, the position where the frequency is maximized is the peak position PK. In the present embodiment, by fitting a probability distribution function (for example, Gaussian distribution function) by the least-squares method, respective values of the histogram are interpolated, and the peak position PK is obtained. Also, other probability distribution functions may be adopted, or fitting of not only the probability distribution function but also interpolation between adjacent two points and multiple-order functions may be carried out. Further, a position of high frequency may be simply used as the peak position PK as it is. The obtained peak position PK is output to the decoding circuit 128 and the position data synthesizing circuit 132 as the peak position signal SA6.

Next, in the decoding circuit 128, the numbers of 1 and 0 are added up in the minimum line width $P_{ABS}$ of the respective ABS patterns 104 for every zone of the minimum line width $P_{ABS}$ from the position where shifted only by the peak position PK of the peak position signal SA6, and the total numbers thereof are obtained (Step S12).

Next, with respect to the added-up result, the same decoding circuit 128 compares whether the total number of 1 is greater or the total number of 0 is greater by the unit of the minimum line width $P_{ABS}$ of the ABS pattern 104, and determines the code based on the value of the total number of which is greater. Based on the determined code, the code is decoded (Step S14). The ABS decoding signal SA7 output decoded and output from the decoding circuit 128 is brought into a pattern shown in FIG. 6(F).

Next, an arithmetic operation for correlation between the decoded pseudorandom code of the ABS decoding signal SA7 and the design value of the pseudorandom code is carried out by the absolute position detection circuit (position detection circuit) 130, and an absolute position of the scale 102 to the light-receiving element 112 is obtained (Step S16). The value is output as the ABS position signal SA8.

Next, position data are synthesized (corrected) by adding the peak position PK of the peak position signal SA6 to the absolute position of the ABS position signal SA8 in the position data synthesizing circuit 132 (Step S18). The synthesized value is output as the position data signal Sout.

As described above, a description was given of a case where the ABS pattern 104 is formed in an ideal shape. However, in the process of forming the ABS pattern 104, there is a possibility that the ABS pattern 104 is made thick or thin. In this case, the signal pattern is shown in FIG. 7 in accordance with the signal processing flow of FIG. 5.

In FIG. 7, the solid lines show an ideal case of the ABS pattern 104, which corresponds to FIG. 6, and the broken lines show signals obtained where the ABS pattern 104 is made thick or thin. Also, FIG. 7(A) through FIG. 7(F) correspond to FIG. 6(A) through FIG. 6(F), respectively. As shown in FIG. 7(B) through FIG. 7(D), if the line width of the ABS pattern 104 is made thick or thin, the rise position and the fall position of the signals shift. However, even in any case of thickening or thinning in the line width of the ABS pattern 104, the shift in the rise position and the fall position of the signals is offset as shown in FIG. 7(C). Therefore, even if the frequency distribution in the histogram becomes smooth as shown in FIG. 7(E), the peak position PK does not shift, wherein the peak position PK by the solid line matches the peak position PK by the broken line. That is, even if the ABS pattern 104 is subjected to thickening or thinning, no influence is given to the peak position PK. That is, by using the peak position detection circuit 126 according to the embodiment, it is possible to prevent any influence due to thickening or thinning of the ABS pattern 104. Accordingly, it becomes possible that the allowance range in the pattern dimensional error can be increased in production of the scale 102.

Thus, in the present embodiment, since an arithmetic operation for correlation is not carried out directly from the A/D converted digital value, but the arithmetic operation for correlation with the pseudorandom code of the design value is carried out after binarized and decoded to code by using the edge detection circuit 124, the peak position detection circuit 126, and the decoding circuit 128, the arithmetic operation amount can be remarkably reduced. For example, if it is assumed that an arithmetic operation for correlation has been conventionally carried out using a 4-bit digital value by the unit of the array arrangement pitch (spatial resolution power) $P_{PDA}$ of the ABS light-receiving element array 114, it is possible to carry out an arithmetic operation for correlation with a remarkably small amount of data of 1 bit by the unit of the minimum line width $P_{ABS}$ of the ABS pattern 104 in the present embodiment. That is, even if the absolute position is frequently measured by using the ABS pattern 104, stabilized measurement having a good slaved tracking performance is enabled with respect to a moving distance.

Simultaneously, the decoding is carried out by the unit of the minimum line width $P_{ABS}$ of the ABS pattern 104, which is the same as the minimum unit of the pseudorandom code of the design value. Therefore, since the lengths of mutual codes are matched with each other when the arithmetic operation for correlation is carried out, it is possible to remarkably clearly determine whether or not there is any correlation. And, since the absolute position is corrected by the peak position PK capable of eliminating influences due to thickening and so on of the line width of the ABS pattern 104 in the position data synthesizing circuit 132, highly accurate measurement of the absolute position is enabled.

That is, the absolute position can be calculated at high accuracy with a small arithmetic operation amount even if the pseudorandom code is used for the ABS pattern 104. Therefore, the absolute position can be frequently calculated from the ABS pattern 104, wherein, for example, if the scale 102 quickly moves greatly, measurement of the moving distance of the scale with respect to the light-receiving element 112 can be carried out with a good slaved tracking performance and the accuracy kept.

Also, even if the ABS pattern 104 is subjected to thickening or thinning, it is possible to secure the accuracy of the absolute position obtained. Therefore, since it is not necessary to severely require the conditions of formation process of the ABS pattern 104, it is possible to achieve a decrease in production costs of the scale 102 and the absolute position length measurement encoder 100.

Although a description was given of Embodiment 1 of the present invention, the present invention is not limited to Embodiment 1. That is, it is a matter of course that the present invention may be subjected to various improvements and design changes without departing from the spirit of the invention.

In Embodiment 1, the signal processing circuit 118 is provided with an edge position detection circuit 124, a peak position detection circuit 126, a decoding circuit 128, an absolute position detection circuit (position detection circuit) 130 and a position data synthesizing circuit 132, the present invention is not limited to these circuit names. It is sufficient that the present invention is provided with the functions of the respective circuits described in the present embodiment.

Figure 8:
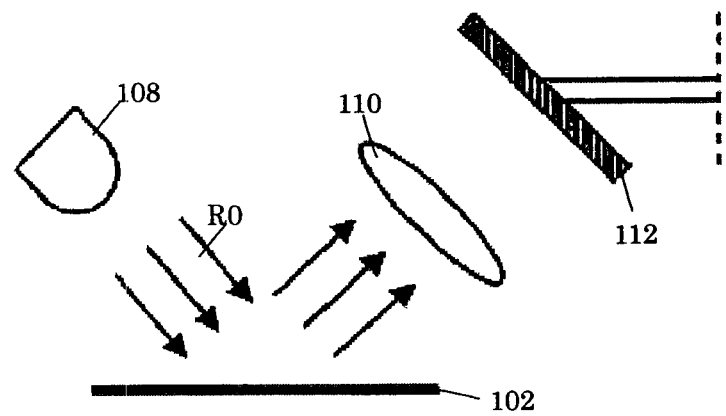
FIG. 8 is a schematic view exemplarily showing the relationship between a light-emitting element, a scale and a light-receiving element according to Embodiment 2 of the present invention.

Further, although, in Embodiment 1 described above, the bright and dark patterns formed by the scale 102 are formed by transmission light of the scale 102, the present invention is not limited thereto. For example, as in Embodiment 2 shown in FIG. 8, such a configuration may be adopted, in which bright and dark patterns are formed by the projection light R0 to the scale 102 being reflected, and are imaged on the light-receiving element 112.

In addition, in Embodiment 1, although the decoding of pseudorandom codes in the decoding circuit 128 was carried out using the peak position PK as the reference position, the present invention is not limited thereto. The decoding may be carried out for each of the minimum line widths $P_{ABS}$ from an optional position.

Also, in the embodiments described above, in order to decode the pseudorandom code from the binarized values, decoding is carried out in such a manner that the total numbers of 1 and 0 are obtained at a cycle of the minimum line width $P_{ABS}$, comparison is carried out with respect to whether the total number of 1 is greater or the total number of 0 is greater, and the code is determined by the value the total number of which is greater. However, the present invention is not limited thereto. For example, the code of the minimum line width $P_{ABS}$ may be determined and decoded by determining that the value at a specified position (for example, the center) of the cycle of the minimum line width $P_{ABS}$ is 1 or 0.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. An absolute position length measurement type encoder, comprising:
a light-emitting element;
a scale having an absolute pattern based on a pseudorandom code and forming bright and dark patterns by the absolute pattern on the projection light from the light-emitting element;
a light-receiving element for receiving the bright and dark patterns;
an edge position detection circuit for obtaining a position, at which an after-differentiated absolute value of a binarized value is locally maximized, for each of the minimum line width zones of the absolute pattern by binarizing a digital signal in accordance with a signal output from the light-receiving element;
a peak position detection circuit for preparing a histogram for the position where the absolute position is locally maximized in the minimum line width zone and for obtaining the peak position from the histogram;
a decoding circuit for decoding pseudorandom codes based on the binarized value;
a position detection circuit for calculating the absolute position of the scale in regard to the light-receiving element by referencing the decoded pseudorandom code with respect to the design value of the pseudorandom code; and
a position data synthesizing circuit for correcting the absolute position of the scale, which has been obtained by the position detection circuit, by the peak position.

2. The absolute position length measurement type encoder according to claim 1, wherein the light-receiving element is made into an array, and the arrangement pitch thereof is one-third or less the minimum line width of the absolute pattern.

3. The absolute position length measurement type encoder according to claim 1, wherein the scale includes an incremental pattern.

4. The absolute position length measurement type encoder according to claim 3, further comprising:
a light-receiving element for receiving bright and dark patterns formed by the incremental pattern;
an incremental position detection circuit for detecting an incremental position by processing a signal output from the light-receiving element; and
an absolute position output circuit for selecting which of a signal output from the incremental position detection circuit or an absolute synthesization position signal output from the position data synthesizing circuit is to be output as a position data signal.

5. The absolute position length measurement type encoder according to claim 4, wherein the absolute position output circuit usually selects a signal output from the incremental position detection circuit, references the signal to the absolute synthesization position signal once every predetermined interval of time, outputs an absolute synthesization position signal as a position data signal if there is a difference in the absolute positions obtained by two signals, and feeds the position data signal back to the incremental position detection circuit and sets it up as the current position inside the incremental position detection circuit.

6. The absolute position length measurement type encoder according to claim 5, wherein the feedback is carried out when data are not renewed in the position data synthesizing circuit by a data refreshing rate.

7. The absolute position length measurement type encoder according to claim 1, wherein the peak position detection circuit interpolates respective values of a histogram by fitting a probability distribution function by the least-squares method and obtains the peak position.

8. The absolute position length measurement type encoder according to claim 1, wherein the decoding circuit decodes a pseudorandom code from the binarized value using the obtained peak position as the reference position of the pseudorandom code.

9. The absolute position length measurement type encoder according to claim 1, wherein the peak position obtained by the decoding circuit is obtained by interpolating the values of the histogram.

10. The absolute position length measurement type encoder according to claim 1, wherein the decoding circuit obtains the respective total numbers of the binarized values in the minimum line width, and determines and decodes the code of the minimum line width based on the value the total number of which is greater.

11. The absolute position length measurement type encoder according to claim 1, wherein the position detection circuit carries out an arithmetic operation for correlation between the decoded pseudorandom code and the design value of the pseudorandom code, and obtains the absolute position of the scale with respect to the light-receiving element.

12. The absolute position length measurement type encoder according to claim 1, wherein the position data synthesizing circuit synthesizes position data by adding the peak position of the peak position signal to the absolute position of the absolute position signal.

* * * * *